(12) United States Patent
Ishida

(10) Patent No.: US 8,400,536 B2
(45) Date of Patent: Mar. 19, 2013

(54) IMAGE PROCESSING METHOD AND IMAGE PROCESSING APPARATUS

(75) Inventor: Yuki Ishida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 12/960,686

(22) Filed: Dec. 6, 2010

(65) Prior Publication Data

US 2011/0141326 A1    Jun. 16, 2011

(30) Foreign Application Priority Data

Dec. 14, 2009  (JP) ................. 2009-283433

(51) Int. Cl.
    H04N 5/202    (2006.01)
(52) U.S. Cl. ................. 348/254; 348/223.1
(58) Field of Classification Search ............ 348/254, 348/223.1; 382/167
    See application file for complete search history.

(56) References Cited

U.S. PATENT DOCUMENTS

2005/0024508 A1*  2/2005  Okisu et al. ............. 348/254
2008/0137961 A1*  6/2008  Ishida et al. ............ 382/197

FOREIGN PATENT DOCUMENTS

| JP | 04-063587 B | 10/1992 |
| JP | 05-103336 A | 4/1993 |
| JP | 06-012204 A | 1/1994 |

* cited by examiner

Primary Examiner — James M Hannett
Assistant Examiner — Yih-Sien Kao
(74) Attorney, Agent, or Firm — Fitzpatrick, Cella, Harper & Scinto

(57) ABSTRACT

This invention has been made to solve the problem that when a duplicated image is generated by capturing an original image using a digital camera and printing the captured image, lighting unevenness occurs in an image captured under a viewing light source, compared to that under flash light with a predetermined irradiation amount, and accurate color conversion cannot be performed. To solve this problem, pixels exhibiting identical colors are selected from a plurality of positions from the image captured under flash light. The positions of the corresponding pixels are selected from the image captured under the viewing light source. If the color values at the pixel positions differ, the influence of lighting unevenness in the viewing light source exists. Thus, shading correction data for the image captured under a viewing light source is generated so as to remove the shading of the image captured under the viewing light source.

8 Claims, 12 Drawing Sheets

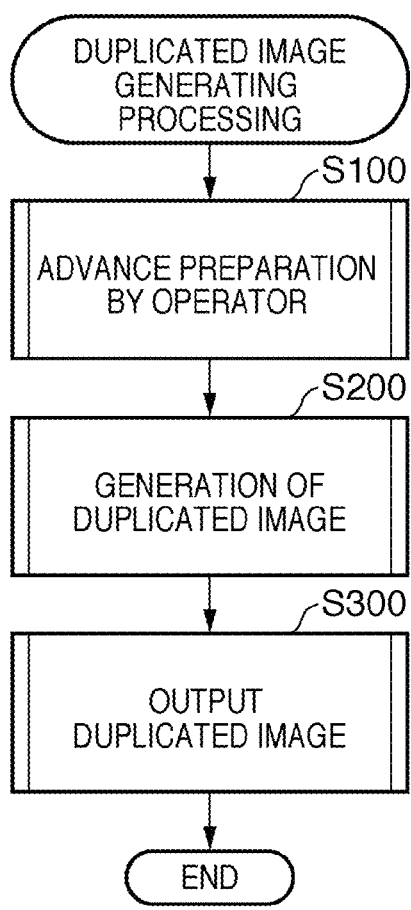
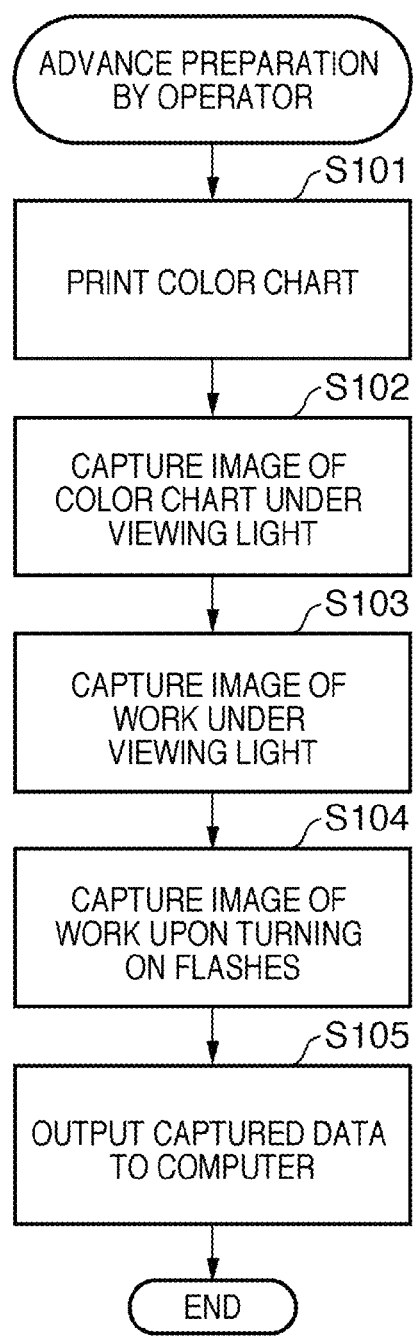

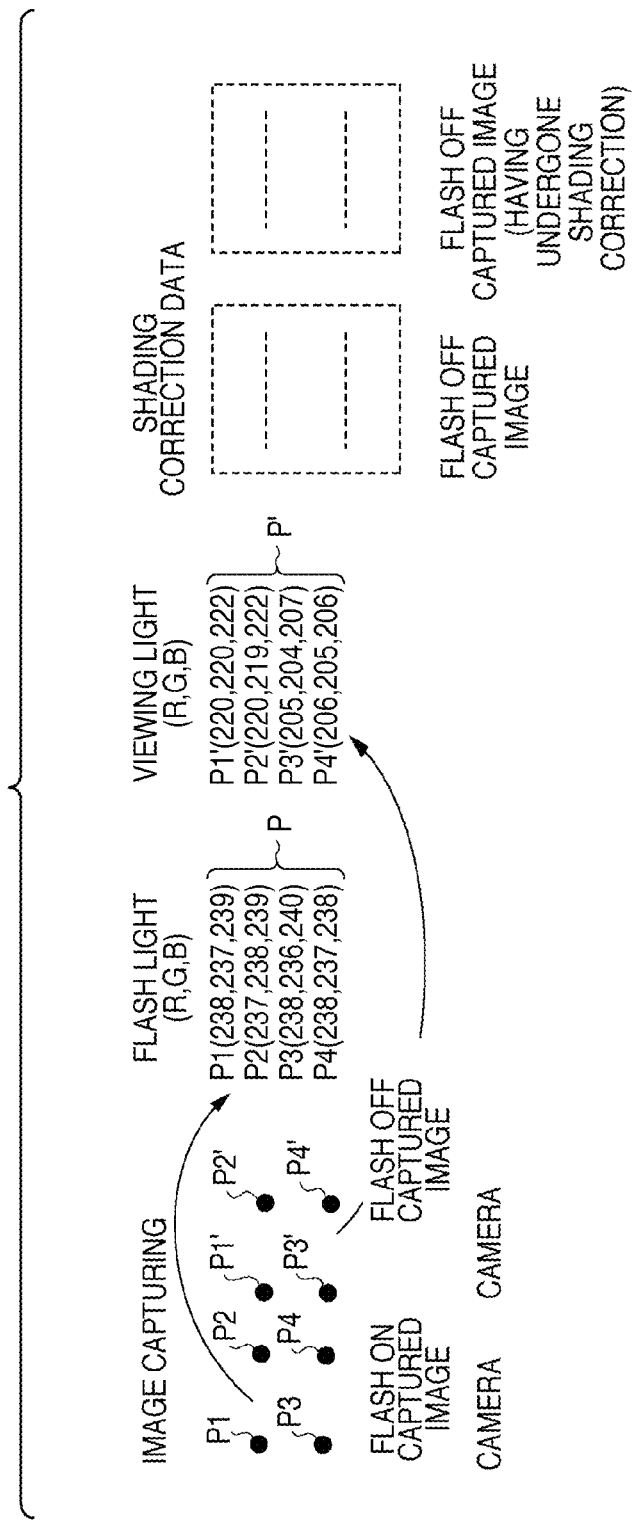

IMAGE PROCESSING METHOD AND IMAGE PROCESSING APPARATUS

BACKGROUND OF THE INVENTION

1. Field of the Invention

The present invention relates to an image processing method and an image processing apparatus. Particularly, the present invention relates to a shading method effective in duplicating cultural properties, works of art, paintings, and the like by combining a digital camera and a printer and an image processing apparatus using the method.

2. Description of the Related Art

Cultural heritages such as sliding screens, folding screens, and paintings are inevitably deteriorating year by year due to the influences of temperature, humidity, sunlight, and the like. In order to pass valuable cultural heritages down the generations, aging cultural heritages have been restored, and attempts have been vigorously made to carefully store cultural heritages and replace them with accurate duplicated images for general exhibitions. For the purpose of enhancing people's recognition of cultural heritages, generated duplicated images are lent out to schools, cultural events, and the like to provide opportunities to make people feel familiar with cultural heritages.

Conventionally, craftsmen have generated duplicated images in handwriting. Handwriting duplication, however, requires many days to generate duplicated images. The quality of duplicated images depends on craftsmanship. In contrast, there is available a method using a digital camera and a printer as a method of generating a high-quality duplicated image in a small number of days. For example, Japanese Patent Laid-Open No. 5-103336 discloses a procedure for this method.

This procedure goes as follows: (1) capturing images of an original image and color chart with a digital camera under the same conditions; (2) generating a color conversion table for color matching between the color space of the camera and the color space of the printer from image signals of R (red), G (green), and B (blue) obtained from the image data of the color chart and input R, G, and B color signals from the color chart; (3) obtaining an image output with the same tone of color as that of the original image by performing color conversion for the image data of the original image using the color conversion table; and (4) outputting the color-converted original image captured image using the color printer.

To generate a very accurate duplicated image, it is necessary to capture an image by irradiating an original image with a sufficient amount of light for lighting without any lighting unevenness at the time of image capturing. This is because, the smaller the amount of light for lighting, the longer the exposure time for image capturing, resulting in electrical noise in the image data. As the exposure time prolongs, using a digital camera with a very large number of pixels makes even slight vibration appear as blur. To maintain the sharpness of a captured image, therefore, it is necessary to secure a sufficient amount of light for lighting.

When an operator captures an image of a work in the presence of lighting unevenness, the unevenness is reflected in the captured image and appears as brightness unevenness in the duplicated image. The operation of correcting this by using image editing software and the like takes much time and requires the operator to have specialized skill. When an image of a work is to be captured, therefore, it is preferable to capture an image of the work upon eliminating unevenness as much as possible by devising lighting. For example, there is available a method of securing the amount of light for lighting and its evenness by preparing many lightings such as artificial sunlight lamps and irradiating a work with light from a plurality of directions. It is often the case in which it is inhibited to irradiate cultural properties having high historical values and paintings with strong lighting in order to protect them or the degree of freedom in installing equipment because of the small depths of exhibition spaces is restricted. In practice, therefore, it is not realistic to capture images of such cultural properties by evenly irradiating them with light from strong lightings such as artificial sunlight lamps.

In most cases, therefore, image capturing is performed by irradiating works with light from many flashes for the following reasons. It is possible for flash light to obtain a sufficient amount of light within an irradiation time of several ten thousandth part of a second to several thousandth part of a second. This can prevent works from being damaged. In addition, this makes it possible to easily install equipment even in a place having a small depth, and allows even lighting. However, the color appearance of a duplicated image generated by using a captured image obtained by irradiation with flash light does not match that of the original image unless under a flash light source. It is practically impossible to view a work under flash light. When people view a duplicated image under an actual viewing light source, the color appearance of the original image does not match that of the duplicated image.

Assume that an operator has generated a duplicated image by capturing images of a color chart and original image under an actual viewing light source without irradiation of flash light. In this case, the color appearance of the original image matches that of the duplicated image under the viewing light source. However, the image data of the original image which is obtained by image capturing without using any flash contains much noise due to blur at the time of image capturing and lighting unevenness. As a consequence, the generated image is not a highly accurate duplicated image.

In order to solve the above problems, therefore, image capturing has been conventionally performed in the following manner.

FIG. 10 is a view schematically showing how image capturing is performed.

As shown in FIG. 10, the operator captures two images of the same original image, that is, "an image captured upon irradiation of flash light (flash captured image)" and "an image captured without flash light (viewing light source captured image)". The operator then generates, from the two captured images, color conversion parameters for light source conversion which are used to convert the color appearance of the flash captured image into that under the viewing light source. The operator converts the color appearance of the flash captured image into that under the viewing light source by using the generated color conversion parameters.

Performing such light source conversion can solve the problems of noise and blur in viewing light source captured images. This light source conversion method, however, cannot still solve the problem of lighting unevenness in viewing light source captured images. If, therefore, light source conversion parameters are generated in the presence of lighting unevenness in a viewing light source captured image, it is impossible to perform accurate light source conversion due to the influence of lighting unevenness.

For this reason, as shown in FIG. 10, only part of the captured image is segmented to correct lighting unevenness in the viewing light source captured image. Although lighting unevenness occurs in the viewing light source captured image, segmenting only part of the image will reduce the influence of the lighting unevenness as compared with the lighting unevenness in the entire viewing light source captured image. Therefore, this technique segments only parts of the flash captured image and viewing light source captured image, and generates color conversion parameters for light source conversion from the segmented images. The technique then converts the colors of the flash captured image into colors optimized for the viewing light source. Generating a duplicated image by using a flash captured image optimized for a viewing light source in this manner will eliminate the problem of lighting unevenness.

As another method of correcting lighting unevenness, shading correction using a reference white board is known. For example, Japanese Patent Laid-Open No. 6-012204 discloses a method of correcting shading by generating illuminance correction data by capturing an image of white paper or the like before capturing an image of an object with a digital camera and applying the illuminance correction data when capturing an image of the object.

The above conventional method, however, has the following drawback.

In the method of segmenting only part of a captured image, the segmented image needs to include most of the colors existing in the original image. This method, therefore, does not perform light source conversion for, for example, the color which does not exist in the segmented image (encircled by the dotted line on the upper left side of the image), as shown in FIG. 10, and generates a duplicated image while maintaining the color appearance under the flash light sources. As described above, it is very difficult to find a region which is almost free from the influence of lighting unevenness and in which most of the colors of the entire original image exist.

On the other hand, shading correction using a reference white board can correct lighting unevenness in a viewing light source captured image by placing the reference white board at the same place as that of an original image and generating shading correction data from the captured image of the board. When handling an expensive work such as a work of art, the operator feels it difficult to move the work because of fear of damage. It is also difficult to place the reference white board at the same position as that of the work of art. That is, it is difficult to align a reference white board with a work of art or original image.

SUMMARY OF THE INVENTION

Accordingly, the present invention is conceived as a response to the above-described disadvantages of the conventional art.

For example, an image processing method and image processing apparatus according to this invention is capable of suitably performing shading correction for lighting unevenness in a viewing light source captured image which poses a problem in light source conversion.

According to one aspect of the present invention, there is provided an image processing method for applying shading correction to image data obtained by capturing an original image under a first light source and generating duplicated image data suitable for viewing under a second light source, comprising: obtaining first light source captured image data of the original image by capturing the original image under the first light source; obtaining second light source captured image data of the original image by capturing the original image under the second light source; extracting pixels whose values fall within a range of a preset threshold value and are regarded as approximately identical colors, and positions of the pixels from the first light source captured image data; extracting, from the second light source captured image data, colors of pixels corresponding to the positions of the pixels extracted from the first light source captured image data; generating shading correction data from differences in color between the corresponding pixels extracted from the first light source captured image data and the second light source captured image data; and applying shading correction to the second light source captured image data by using the generated shading correction data.

According to another aspect of the present invention, there is provided an image processing apparatus to which the method is applied.

According to still another aspect of the present invention, there is provided a non-transitory computer readable memory which stores a program for causing a computer to function as each unit of the above image processing apparatus.

The invention is particularly advantageous since it is possible to generate shading correction data from an image captured under the first light source and an image captured under the second light source as a viewing light source and apply shading correction to the image captured under the second light source by using the data. This makes it possible to remove the influence of lighting unevenness from the image captured under the second light source to which shading correction has been applied.

Further features of the present invention will become apparent from the following description of exemplary embodiments (with reference to the attached drawings).

BRIEF DESCRIPTION OF THE DRAWINGS

FIGS. 3A, 3B, and 3C are flowcharts showing an overall procedure for duplicated image generating processing.

FIGS. 7A and 7B are views for schematically explaining shading correction data generating processing.

DESCRIPTION OF THE EMBODIMENT

An Exemplary embodiment of the present invention will now be described in detail in accordance with the accompanying drawings. Note that each arrangement disclosed in the following embodiment is merely illustrative, and the present invention is not limited to the arrangements shown in the accompanying drawings.

Figure 1:
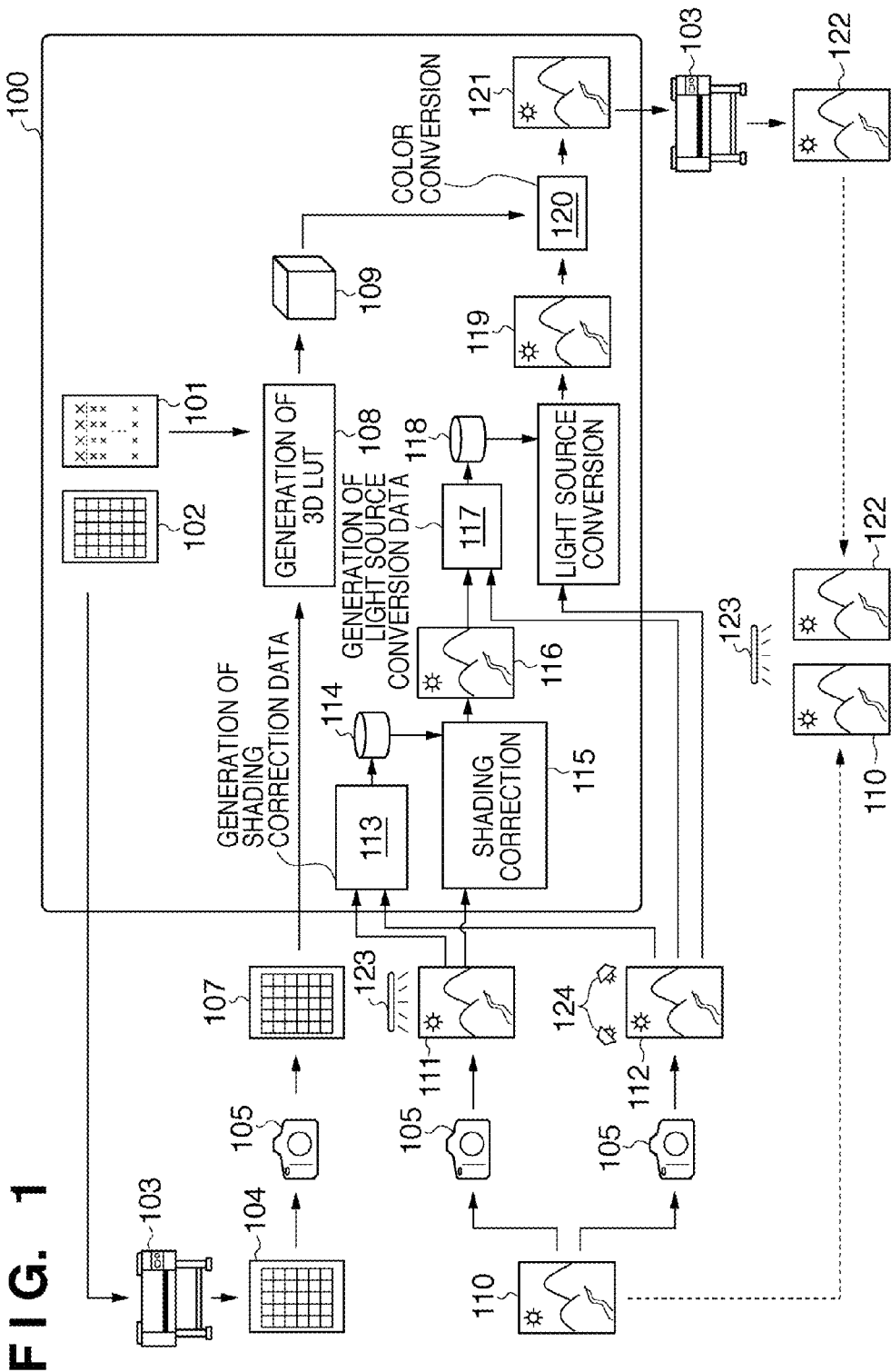
FIG. 1 is a view showing the overall schematic arrangement of an image processing system according to an exemplary embodiment of the present invention and an outline of a duplicated image generating method applied to the system.

FIG. 1 is a view showing the overall schematic arrangement of an image processing system according to an exemplary embodiment of the present invention and an outline of a duplicated image generating method applied to the system.

This image processing system includes an image processing apparatus 100, such as a personal computer, which incorporates a CPU and can execute computer programs, a printer 103, and a digital camera 105. Referring to FIG. 1, the units shown in the image processing apparatus 100 are portions of image processing executed by the CPU.

In the image processing apparatus 100, original color chart data 101 and color chart image data 102 are stored in a nonvolatile memory (a semiconductor disk such as an EEPROM or FeRAM or a hard disk) in correspondence with each other. Note that the color chart image data 102 has a plurality of color patches laid out, which are used to generate color conversion parameters. The original color chart data 101 stored in the memory includes the R, G, and B values of the plurality of patches laid out in the color chart image data 102.

Figure 2A:
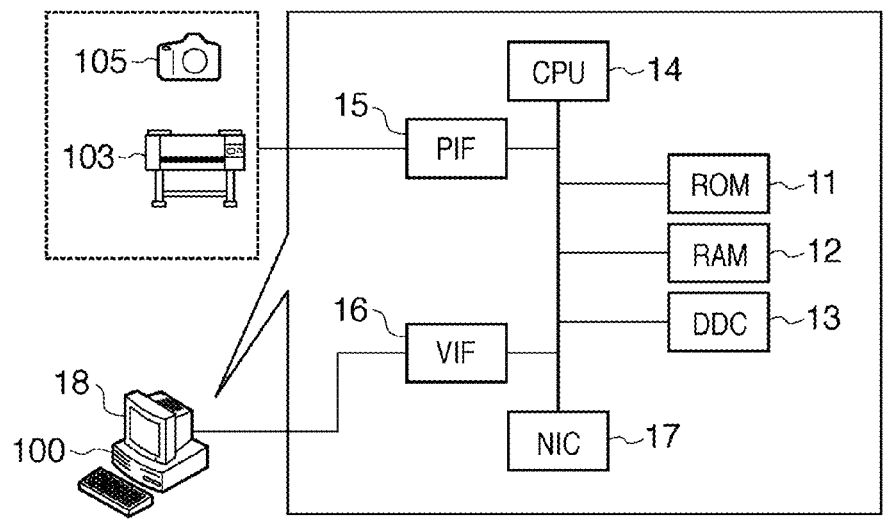
FIG. 2A is a block diagram showing the arrangement of an image processing apparatus 100.
Figure 2B:
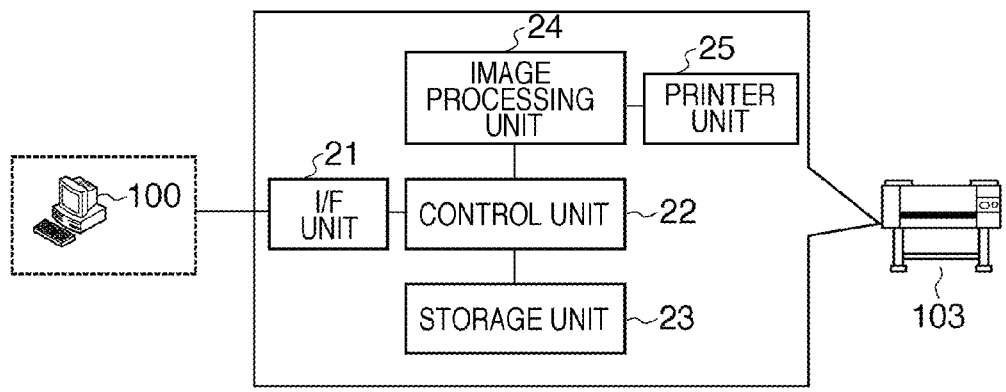
FIG. 2B is a block diagram showing the arrangement of a printer 103.
Figure 2C:
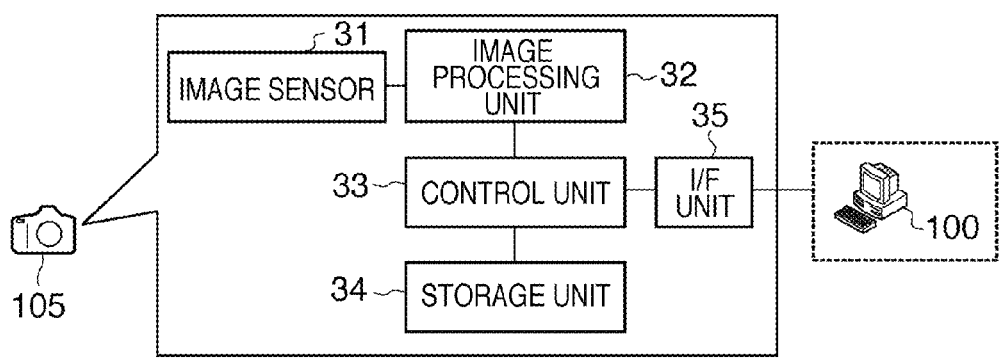
FIG. 2C is a block diagram showing the arrangement of a digital camera 105.

FIGS. 2A, 2B, and 2C are block diagrams respectively showing the arrangements of the image processing apparatus 100, printer 103, and digital camera 105. Note that the following description will describe only constituent elements necessary for explaining the present invention. Obviously, however, each apparatus includes well known constituent elements in addition to those included in the arrangement shown in a corresponding one of FIGS. 2A, 2B, and 2C.

As shown in FIG. 2A, the image processing apparatus 100 includes a ROM 11, a RAM 12, a DDC (disk drive controller) 13, and a CPU 14. The image processing apparatus 100 further includes a PIF (peripheral interface) 15, a VIF (video interface) 16, and a NIC (network interface card) 17. These constituent elements can exchange data via a bus (not shown). In addition, the VIF 16 inputs and outputs data to and from a monitor 18 externally connected to the image processing apparatus 100. The CPU 14 can control the monitor 18 via the VIF 16.

The DDC 13 controls data input/output to/from various kinds of storage media such as a flexible disk, compact disk, USB memory, and HDD (hard disk drive). The NIC 17 controls data input/output to/from various external devices connected via a network. The PIF 15 controls data input/output to/from various kinds of peripheral devices connected to the image processing apparatus. In this embodiment, the printer 103 and the digital camera 105 are connected to the PIF 15 to input and output data. Note that the connection forms between the PIF 15 and various kinds of peripheral devices are not limited to dedicated cables and the like, and may be other connection forms such as wireless connection and USB connection.

In addition, it is possible to input and output data to and from other devices via the NIC 17 and the DDC 13. Although the image processing apparatus of this embodiment is a personal computer having a well-known arrangement, the present invention can be widely applied to any device which has a data input/output function and a data computation/storage function. For example, any printer or camera which has a data computation/storage function can implement the same processing as that implemented by the image processing apparatus 100. In this case, some of the respective peripheral devices can replace the image processing apparatus.

As shown in FIG. 2B, the printer 103 includes an interface (I/F) unit 21, a control unit 22, a storage unit 23, an image processing unit 24, and a printing unit 25. The I/F unit 21 receives image data from an external device. The control unit 22 manages jobs and controls data processing associated with the printer 103 such as control for image processing and printing. The storage unit 23 stores firmware and printing parameters and serves as an intermediate buffer to store intermediate data. The image processing unit 24 performs image processing such as color conversion and N-ary conversion for image data. The printing unit 25 prints the image data processed by the image processing unit 24 in accordance with a predetermined printing method. Note that the printer 103 in this embodiment is an inkjet printer. However, it is possible to use other types of printers using an electrophotographic method, sublimation method, and the like.

As shown in FIG. 2C, the digital camera 105 includes an image sensor 31, an image processing unit 32, a control unit 33, a storage unit 34, and an interface (I/F) unit 35. The image sensor 31 obtains the image signal captured by a CCD (or CMOS sensor). The image processing unit 32 applies image processing such as color conversion processing and filter processing to the image signal to convert it into image data. The storage unit 34 then stores the data. The control unit 33 controls each process. The control unit 33 also transmits image data to the image processing apparatus 100 via the I/F unit 35. Note that the digital camera 105 in this embodiment includes a wide variety of devices configured to convert images into digital images. If, therefore, even an image recorded on an analog recording medium such as a film can be converted into a digital image afterward, the image processing apparatus 100 can process image data obtained from the digital image.

Figure 3C:
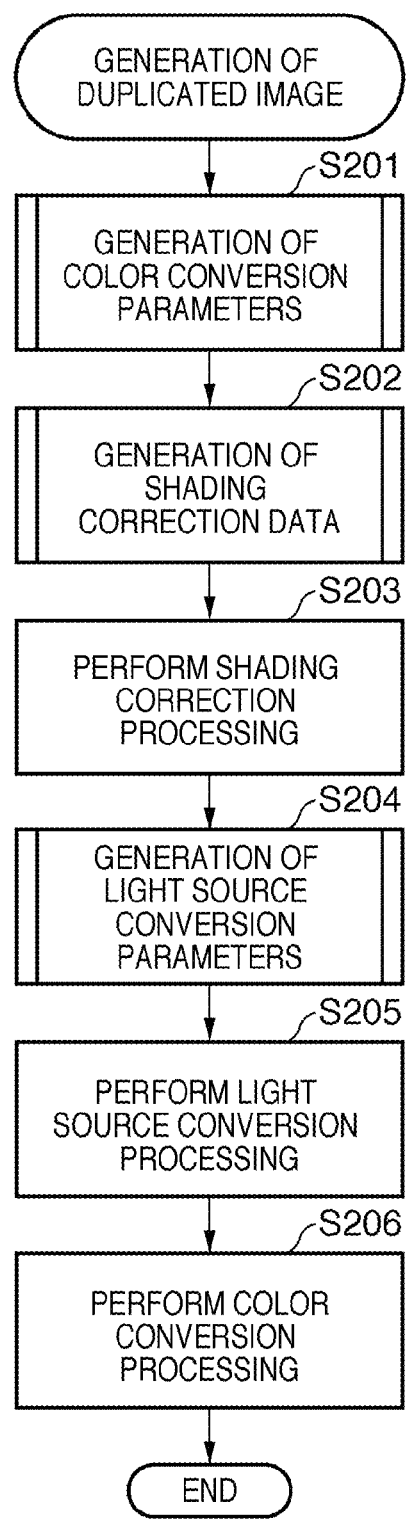

FIGS. 3A to 3C are flowcharts showing an overall procedure for duplicated image generating processing. FIG. 3A is a flowchart showing an overall outline of the procedure. FIG. 3B is a flowchart showing the details of advance preparation by the operator. FIG. 3C is a flowchart showing the details of duplicated image generating processing.

As shown in FIG. 3A, in step S100, the operator performs advance preparation. In this case, the preparation includes outputting a color chart, capturing an image of the chart, capturing an image of work, and inputting data to the computer. In step S200, the image processing apparatus 100 internally performs duplicated image generating processing to which the present invention is applied to generate image data of a duplicated image (flash light source captured image data) 119. Finally, in step S300, the image processing apparatus 100 sends out the duplicated image data to the printer 103, thereby printing a duplicated image.

Figure 4A:
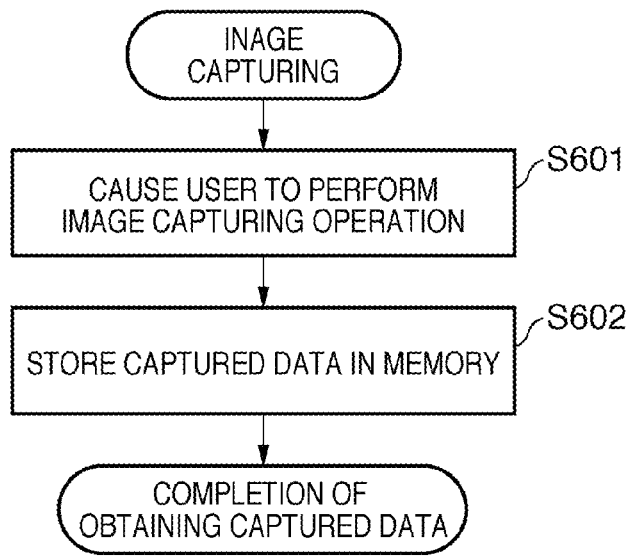
FIGS. 4A and 4B are flowcharts showing general procedures for image capturing and printing.
Figure 4B:
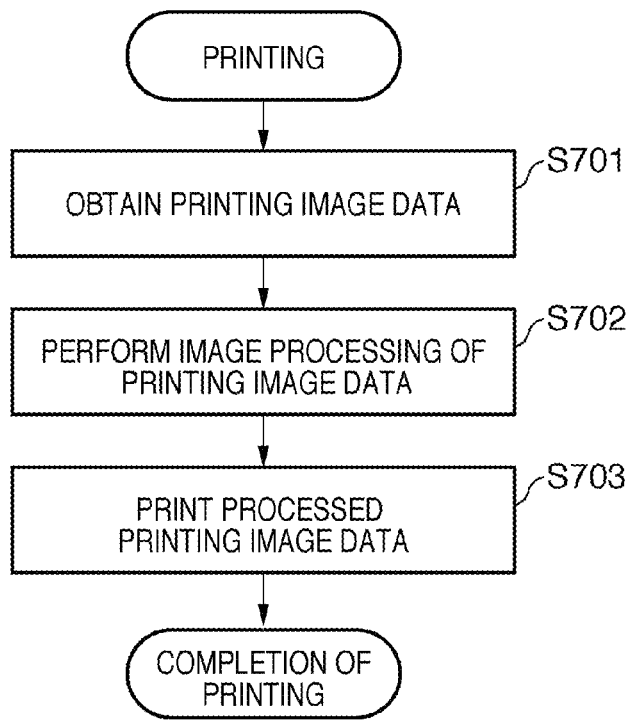

FIGS. 4A and 4B are flowcharts showing general procedures for image capturing and printing.

As shown in FIG. 4A, in image capturing, the user performs image capturing operation using the digital camera 105 in step S601. In step S602, the storage unit 34 of the digital camera 105 stores the captured image data. As shown in FIG. 4B, in printing, printing image data is obtained in step S701. In step S702, image processing is applied to the printing image data. This image processing is well-known image processing before general printing operation, and may use any method. Finally, in step S703, the image data having undergone image processing is printed. In the following description, a description of such image capturing and printing operation will be omitted.

Refer back to FIG. 3B to continue the description. In advance preparation by the operator in step S100, first of all, the operator operates the image processing apparatus 100 in step S101 to transmit the color chart image data 102 to the printer 103 so as to output a color chart 104. Paper on which the color chart is printed and various printing conditions are the same as those for subsequent printing operation for a duplicated image of work.

In step S102, the operator captures an image of the color chart 104 by using the digital camera 105 without using any flash (under a viewing light source). The digital camera 105 temporarily and internally stores color chart captured image data 107 obtained by image capturing. The operator performs this image capturing operation upon setting the color chart under the viewing light source for a duplicated image. This makes the color appearance of the image obtained from the color chart captured image data 107 conform to the spectrum of the viewing light source. The viewing light source is also referred to as the second light source.

In step S103, the operator captures an original image 110 by using the digital camera 105 under a viewing light source 123. The digital camera 105 temporarily and internally stores image data 111 of the original image (to be referred to as viewing light source captured image data) obtained by this image capturing operation under the viewing light source. The operator performs this image capturing operation under the viewing light source for the original image. This makes the color appearance of the image obtained from the viewing light source captured image data 111 conform to the spectrum of the viewing light source. If, however, the light amount of the viewing light source is insufficient, the exposure time prolongs. This may lead to an image containing much noise. This image may also have some blur. Viewing light source captured image data is also referred to as second light source captured image data.

In step S104, the operator captures the original image 110 by using the digital camera 105 while using flashes 124 (under flash light sources). The digital camera 105 temporarily and internally stores flash light source captured image data 112 captured while the flashes are ON. The color appearance of the image obtained from the flash light source captured image data 112 conforms to that of the flash light sources. Using the flashes 124 can secure a sufficient light amount for the viewing light source and hence can obtain an image with little noise. This image has no blur. Note that in image capturing operation using the flashes 124, the operator performs image capturing with little lighting unevenness by using a plurality of flashes and without negative effects due to total reflection. A flash light source is also referred to as the first light source. Flash light source captured image data is also referred to as the first light source captured image data.

In step S105, the operator inputs, to the image processing apparatus 100, the color chart captured image data 107, the viewing light source captured image data 111 obtained by capturing the original image under the viewing light source 123, and the flash light source captured image data 112 obtained by capturing the original image by using the flashes 124. In this case, the digital camera 105 is connected to the image processing apparatus 100 via a USB or wireless LAN to automatically input image data to the image processing apparatus 100 immediately after image capturing. Obviously, a compact storage medium such as a compact flash card may be removed from the digital camera 105 and inserted into the image processing apparatus 100 to copy image data to the image processing apparatus 100.

In the above manner, the operator completes advance preparation in step S100 in FIG. 3A.

When this advance preparation is complete, the image processing apparatus 100 has completed to receive the original color chart data 101 of the color chart, the color chart captured image data 107, the viewing light source captured image data 111, and the flash light source captured image data 112.

Duplicated image generating processing in step S200 will be described next with reference to FIG. 3C.

In step S201, the image processing apparatus 100 generates color conversion parameters. The color conversion parameters generated in this case are a three-dimensional color conversion lookup table 109 (to be referred to as the color conversion 3D LUT hereinafter) for color-converting the R, G, and B values (to be referred to as camera R, G, and B values hereinafter) captured by the digital camera into R, G, and B values (to be referred to as printer R, G, and B values hereinafter) to be input to the printer. The color conversion 3D LUT 109 is data for color matching between an original image captured by the digital camera and a duplicated image to be printed by the printer. Color conversion parameters are generated based on the original color chart data 101 and the color chart captured image data 107.

Figure 5A:
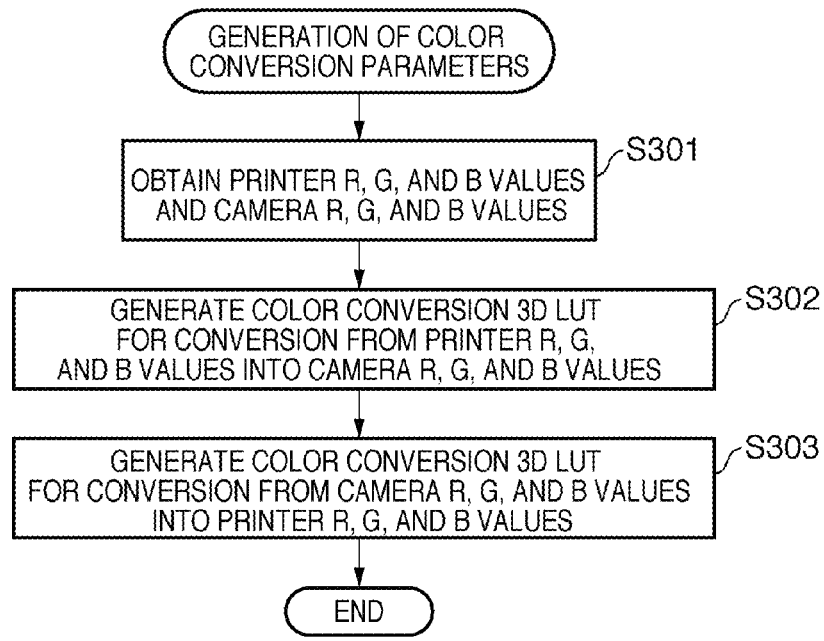
FIG. 5A is a flowchart showing color conversion parameter generating processing.
Figure 5B:
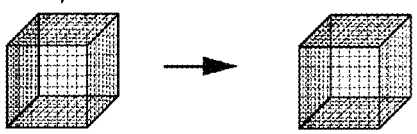
FIG. 5B is a view for schematically explaining color conversion parameter generating processing.

The generation of the color conversion 3D LUT 109 in step S201 will be described in detail below with reference to FIGS. 5A and 5B. FIG. 5A is a flowchart showing the processing of generating the color conversion 3D LUT 109. FIG. 5B is a view showing the detailed contents of the 3D LUT.

In step S301, this apparatus obtains printer R, G, and B values and camera R, G, and B values. The printer R, G, and B values are the R, G, and B values input to the printer when the printer 103 printed the color chart image data 102, that is, the original color chart data 101 itself.

The left side of FIG. 5B shows the R, G, and B data used to print 729 (=9×9×9) patches. These data are R, G, and B values input to the printer in patch printing, and hence are referred to as printer R, G, and B values. The right side of FIG. 5B shows camera R, G, and B values constituted by the R, G, and B values of the respective patches (9×9×9=729) extracted from the color chart captured image data 107. One patch of the color chart captured image data 107 is constituted by a plurality of pixels. Assume that the average values of the R, G, and B values of a plurality of pixels constituting one given patch are the camera R, G, and B values of the patch. The apparatus obtains the R, G, and B values of all the patches in the color chart as camera R, G, and B values by performing this processing for all the patches. As indicated by the table on the right side of FIG. 5B, the apparatus obtains the R, G, and B values of the patches as camera R, G, and B values in correspondence with the respective patches.

Note that since the image of the color chart is captured without any flash, the color chart captured image data 107 may be influenced by noise components and slight blur. However, averaging a plurality of pixels for each patch can greatly reduce the influences of noise and blur. In addition, an A4 to A3 sized color chart is sufficient in terms of size, and hence the influence of lighting unevenness is small. It is, therefore, possible to obtain sufficiently practical data even by capturing an image of the color chart under a viewing light source.

In step S302, this apparatus generates a color conversion 3D LUT for conversion from printer R, G, and B values into camera R, G, and B values. FIG. 5B conceptually shows a 3D LUT used to convert printer R, G, and B values into camera R, G, and B values. The printer R, G, and B values are arranged at equal intervals, and hence are regarded as lattice points. A 3D LUT is then generated to have camera R, G, and B values as conversion values at the lattice points. If, for example, lattice points are arranged to make printer R, G, and B values become 0, 32, 64, 96, ..., 255, a 3D LUT constituted by a total of 729 (=9×9×9) lattice points can be generated.

In step S303, the apparatus generates an inverted 3D LUT to inverse-convert the camera R, G, and B values into the printer R, G, and B values by using the 3D LUT generated in step S302.

As is obvious from the camera R, G, and B values on the right side of FIG. 5B, the camera R, G, and B values obtained from the color chart captured image data 107 in step S301 are not arranged at equal intervals unlike the printer R, G, and B values. Therefore, the apparatus calculates conversion values corresponding to the lattice points of the inverted 3D LUT by using the 3D LUT. More specifically, the apparatus calculates values between the lattice points by interpolating the inverted 3D LUT and obtains conversion values corresponding to the lattice points of the inverted 3D LUT. With this processing, the apparatus obtains conversion values corresponding to the lattice points of the inverted 3D LUT, and can generate an inverted 3D LUT to convert the camera R, G, and B values into printer R, G, and B values. Although the inverted 3D LUT may have any desired number of lattice points, a number of lattice points should be as many as possible for accurate color matching. Note that it is possible to use various types of interpolation methods such as tetrahedral interpolation and cubic interpolation as interpolation methods for a 3D LUT.

With the above processing, this apparatus generates a color conversion 3D LUT to convert camera R, G, and B values into printer R, G, and B values. This LUT provides color conversion parameters for matching the color appearance of the object whose image has been captured by the digital camera with that of a printed product to be output from the printer. Note that the color appearances of them match most with each other when people view the printed product under the same light source as that used when the image of the color chart was captured. The generated color conversion parameters (color conversion 3D LUT) are denoted by reference numeral 109 in FIG. 1.

In step S202 in FIG. 3C, the apparatus generates shading correction data in step S202 in FIG. 3C. The details of this generating operation will be described with reference to FIGS. 6 to 8B.

Figure 6:
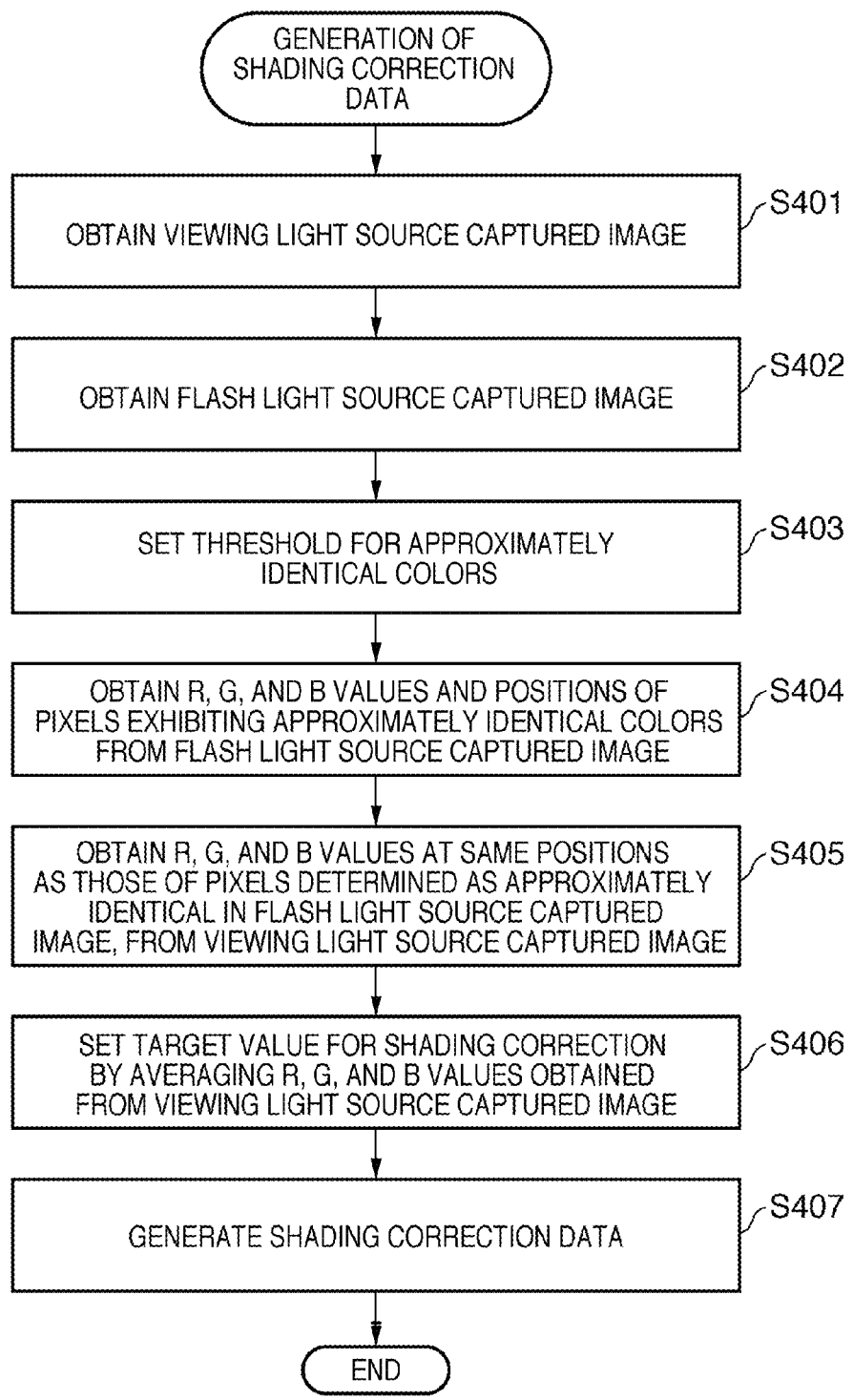
FIG. 6 is a flowchart showing shading correction data generating processing.

FIG. 6 is a flowchart showing the details of shading correction data generating processing.

First of all, in step S401, the apparatus obtains the viewing light source captured image data 111 obtained by capturing the original image 110 under the viewing light source. In step S402, the apparatus obtains the flash light source captured image data 112 obtained by capturing the original image 110 under flash light sources. In this case, the viewing light source 123 for the viewing light source captured image data 111 is a light source using no flash, and cannot be specified. Assume that an image of a work of art is captured in an exhibition room, shrine, or the like. In this case, the light source in that place is a viewing light source. Obviously, the amount of light for lighting for the above work of art may decrease or lighting unevenness may occur. In contrast, the flash light source captured image data 112 can adjust the flashes 124 as much as possible in an environment where works of art are exhibited. More specifically, it is possible to irradiate a work of art with light from many directions by using a plurality of flash light sources. This makes it possible to capture an image of the work of art with a sufficient amount of light and little lighting unevenness.

In step S403, the apparatus sets threshold values for colors regarded as approximately identical to each other in a flash light source captured image. Assume that a threshold value of ±2 is set for each of R, G, and B values. In this case, colors in the threshold range (identical colors: pixel value ±2) are regarded as approximately identical colors. Assume that identical colors are values to be found in step S404. In step S404, the apparatus obtains, from the flash light source captured image data 112, the approximately identical R, G, and B values of pixels and their positions (X values, Y values) within the image. The X values and the Y values respectively indicate coordinate positions in the lateral direction and coordinate positions in the longitudinal direction with the upper left pixel in the captured image being a reference point (origin).

Figure 7A:
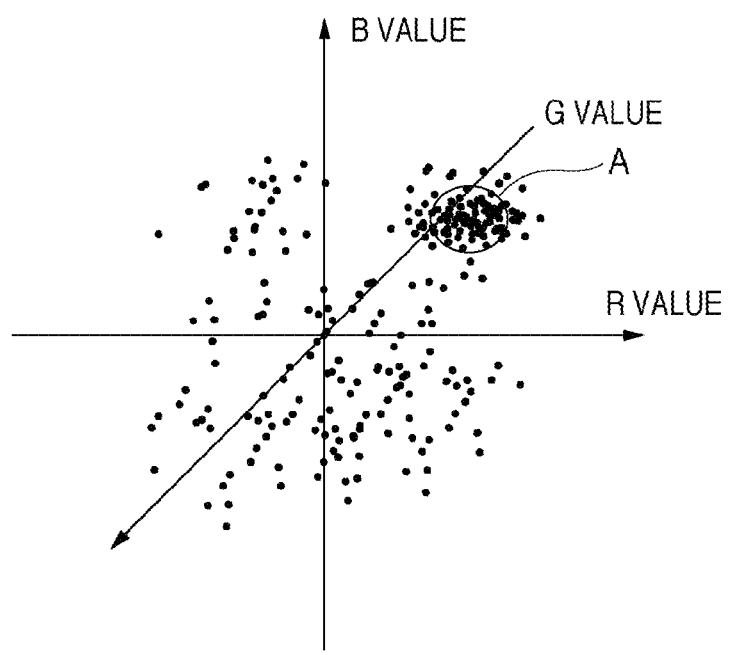

FIG. 7A is a view obtained by plotting the R, G, and B values of the pixels constituting the flash light source captured image data 112 in the RGB space. In order to generate accurate shading correction data, pixels, whose RGB values are approximately identical to each other, should be collected as many as possible. For this reason, referring to FIG. 7A, the pixels in the region indicated by "A" (in which the frequency of approximately identical color values is high) are regarded as approximately identical pixels, and the R, G, and B values of these pixels and their positions (X values, Y values) are obtained. Other methods of obtaining approximately identical pixels to generate accurate shading correction data include a method of obtaining pixels having approximately identical colors diffused within the image. Obtaining colors diffused within the image can correct shading for the entire image. The method of obtaining optimal pixels varies depending on an original image or work of which duplicated image is to be generated.

In step S405, the apparatus obtains R, G, and B values at the same positions (X values, Y values) as those obtained in step S404 from the viewing light source captured image data 111. As shown in FIG. 7B, the R, G, and B values of the flash light source captured image data 112 which correspond to positions P1, P2, P3, and P4 fall within the ranges of approximately identical colors. However, the R, G, and B values of the viewing light source captured image data 111 which correspond to corresponding positions P1', P2', P3' and P4' on the viewing light source captured image differ from each other due to the influence of lighting unevenness. The apparatus generates lighting unevenness data for the generation of shading correction data by using such differences in color.

If the approximately identical colors selected in step S404 are diffused over the entire image, lighting unevenness data can be relatively easily generated. In some cases, however, approximately identical colors do not exist over the entire image. A method of generating lighting unevenness data when no approximately identical colors exist in part of an image will be described with reference to FIG. 8A.

Figure 8A:
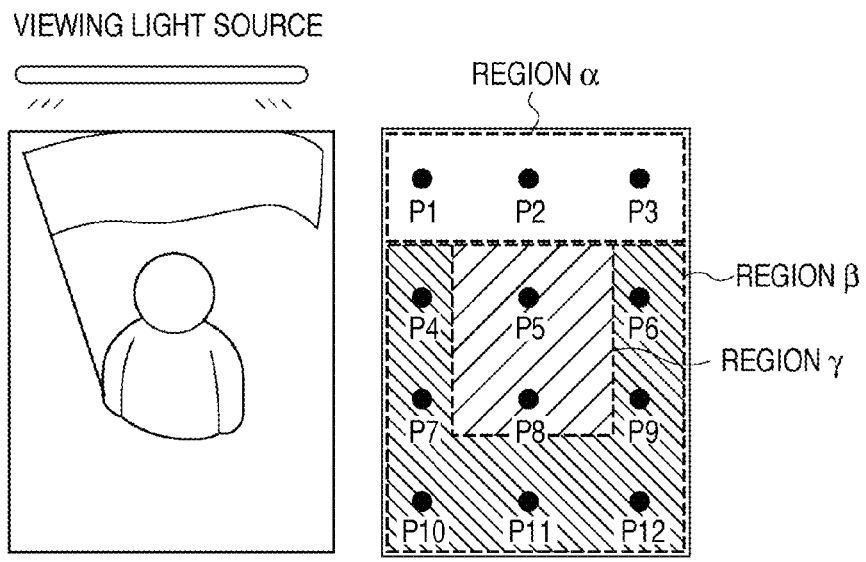
FIGS. 8A and 8B are views for schematically explaining shading correction data generating processing.

It is possible to segment the image on the left side of FIG. 8A for each color into the regions on the right side of FIG. 8A. That is, the colors frequently used in a region α do not exist in regions β and γ. Likewise, the colors frequently used in the region β do not exist in the regions α and γ. The colors frequently used in the region γ do not exist in the regions α and β. When generating a duplicated image of such an image, the apparatus generates shading correction data by using the approximately identical colors in the region β which is the widest region.

Using only the approximately identical colors in the region β can obtain color values at positions P4, P6, P7, P9, P10, P11, and P12 in FIG. 8A but cannot obtain color values at positions P1, P2, P3, P5, and P8. It is therefore impossible to generate suitable shading correction data. For this reason, this apparatus obtains color values at the positions P1, P2, P3, P5, and P8 by interpolation or extrapolation based on the color values at the positions P4, P6, P7, P9, P10, P11, and P12. The image shown in FIG. 8A is irradiated by the viewing light source only from the above. In this case, the lighting unevenness tends to appear in such manner that the upper portion of the image is bright, and the lower portion of the image is dark. If, for example, (R, G, B) values are (100, 100, 100) at P4, (90, 90, 90) at P7, and (80, 80, 80) at P10, the R value (R1) at P1 is calculated according to the following equation:

$$R1=(R4-R7)\times(\text{distance between } P1 \text{ and } P7)/(\text{distance between } P1 \text{ and } P4)+R7$$

The apparatus calculates the R value (R3) at the position P3 in the same manner. On the other hand, since the R value (R5) at the position P5 corresponds to the midpoint between P4 and P6, the apparatus calculates the R value at P5 by using the R value (R4) at the position P4 and the R value (R6) at the position P6 according to the following equation:

$$R5=R4+(R6-R4)/2$$

The apparatus calculates the R value (R2) at the position P2 and the R value (R8) at the position P8 in the same manner. The apparatus also calculates the values of G and B components in the same manner. The apparatus interpolates and calculates the color values of the entire image from the color values at the positions P1 to P12 obtained in this manner. Performing the above calculation can generate lighting unevenness data even in regions on the image in which approximately identical colors do not exist.

In step S406, the apparatus decides a target value for shading correction. Several methods of selecting a target value will be described with reference to FIG. 8B.

Figure 8B:
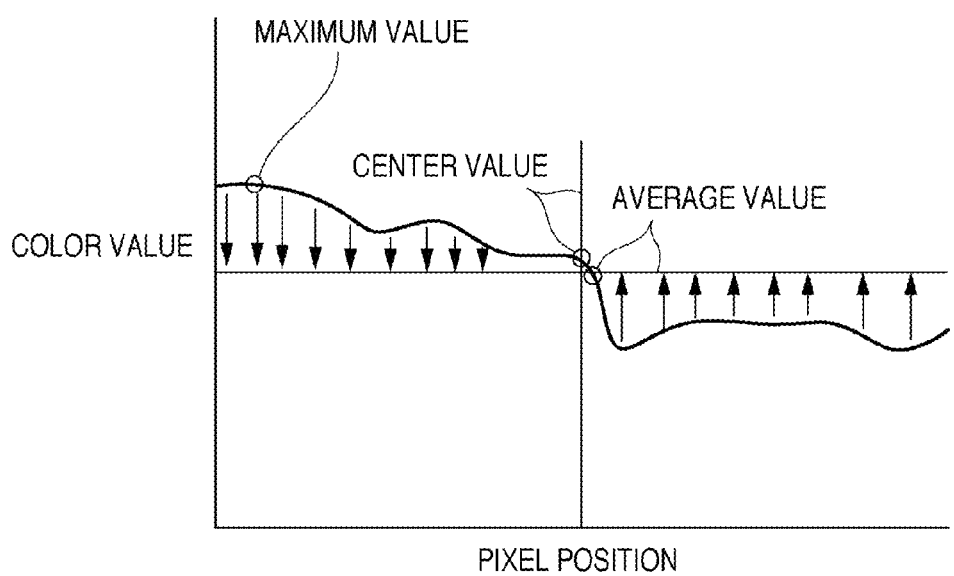

Referring to FIG. 8B, the abscissa represents the pixel position in the longitudinal direction, and the ordinate represents the color value. The first method of deciding a target value is a method of averaging the color values obtained from the viewing light source captured image data 111. That is, the apparatus obtains the average value of each of the R, G, and B values of the viewing light source captured image data 111 obtained in step S405, and sets the average value as a shading correction target value. This method is effective when it is difficult to locate the direction of a viewing light source, that is, when it is difficult to set a target value because of the presence of many viewing light sources. The second method of deciding a target value is a method of setting a center value. When, for example, an original image is irradiated by a fluorescent lamp as a viewing light source from above, the median value of the amount of light for lighting applied to the original image corresponds to a position near the center position of the image. Therefore, setting a center position as a target value can match it with the midpoint of the amount of light for lighting. The third method of deciding a target value is a method of setting the maximum value of color values as a target value. A place where the maximum color value appears can be regarded as a place where the amount of light for lighting from the viewing light source is largest. This method is therefore effective when a place where the amount of light for lighting is large is a region of most interest on the original image. The method of setting a target value for shading correction is not limited to the above methods, and it is possible to set a target value by using other methods.

In step S407, the apparatus generates shading correction data 114. The shading correction data is constituted by the shading target value obtained in step S406 and the lighting unevenness data obtained in step S405.

Referring back to FIG. 3C, the apparatus performs, in step S203, shading correction processing for the viewing light source captured image data 111 by using the shading correction data generated in step S202. With this step, the apparatus generates shading-corrected viewing light source captured image data 116 with little influence of lighting unevenness.

When using, for example, R, G, and B values, the apparatus performs shading correction, that is, shading correction for each value of the R, G, and B component data of each pixel of a viewing light source captured image, in the following manner. The apparatus performs shading correction for each color component as follows:

(color value after correction)=(color value before correction)×(shading target value)/(lighting unevenness data)

In this case, the color value before correction represents the value of each pixel in the viewing light source captured image. In addition, the apparatus uses the color value of a pixel corresponding to lighting unevenness data described in connection with step S404. The shading target value indicates the value set in step S405. It is possible to perform shading correction for the viewing light source captured image by performing the above calculation for all the pixels of the viewing light source captured image data in association with the data of each pixel of the R, G, and B components.

Although this embodiment performs shading correction for each color component in the RGB space, it is possible to use other color spaces. For example, the same effect as that described above can be obtained even if R, G, and B data are converted into data in YCbCr color space including luminance component, and shading correction is performed for the luminance component Y. In addition, the calculation for shading correction is not limited to the method described in this embodiment, and it is possible to use other known methods.

In step S204, the apparatus generates light source conversion parameters from the shading-corrected viewing light source captured image data 116 and the flash light source captured image data 112.

Figure 9A:
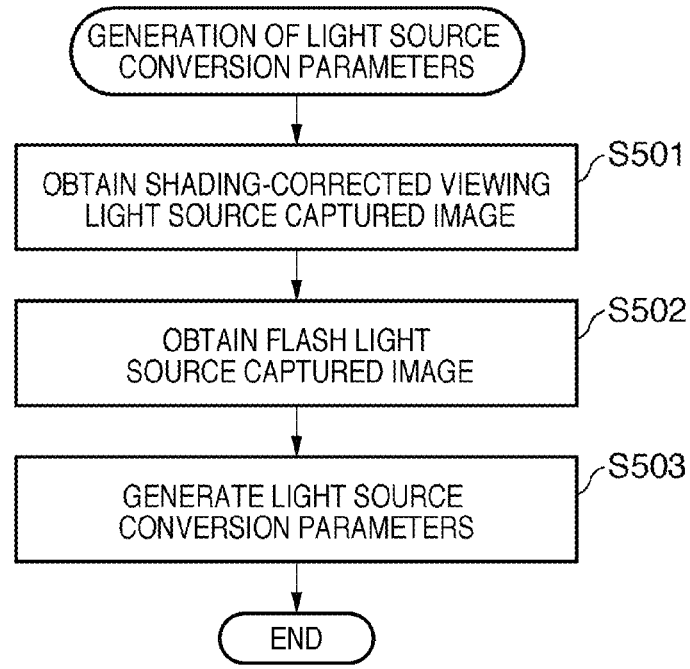
FIG. 9A is a flowchart showing light source conversion parameter generating processing.

A method of generating light source conversion parameters will be described below with reference to FIGS. 9A and 9B. Although described above, light source conversion parameters are conversion parameters for matching the color appearance of a flash light source captured image with that of an image under a viewing light source. The viewing light source captured image data 111 suffers from the problems of a decrease in light amount, noise, and blur in image capturing. Since a flash light source captured image can reproduce only color appearance under flash light sources, the apparatus performs light source conversion to optimize the flash light source captured image data for viewing under the viewing light source.

First of all, in step S501, the apparatus obtains shading-corrected viewing light source captured image data 116. In step S502, the apparatus obtains the flash light source captured image data 112. In step S503, the apparatus generates light source conversion parameters 118 from the shading-corrected viewing light source captured image data 116 and the flash light source captured image data 112.

N×M matrix conversion is used as a conversion method. In general, however, 3×3 matrix conversion allows sufficiently accurate conversion, as shown in FIG. 9B. If higher accuracy is required, it is possible to use a 3D LUT used for a color conversion table. In this manner, the apparatus generates light source conversion parameters.

Figure 9B:
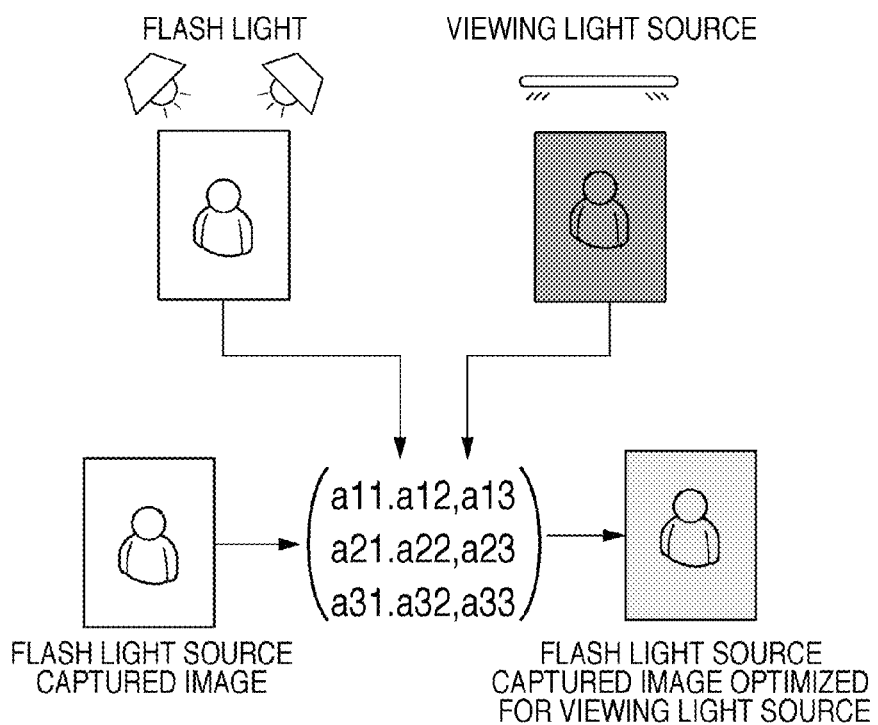
FIG. 9B is a view for schematically explaining light source conversion parameter generating processing.
Figure 10:
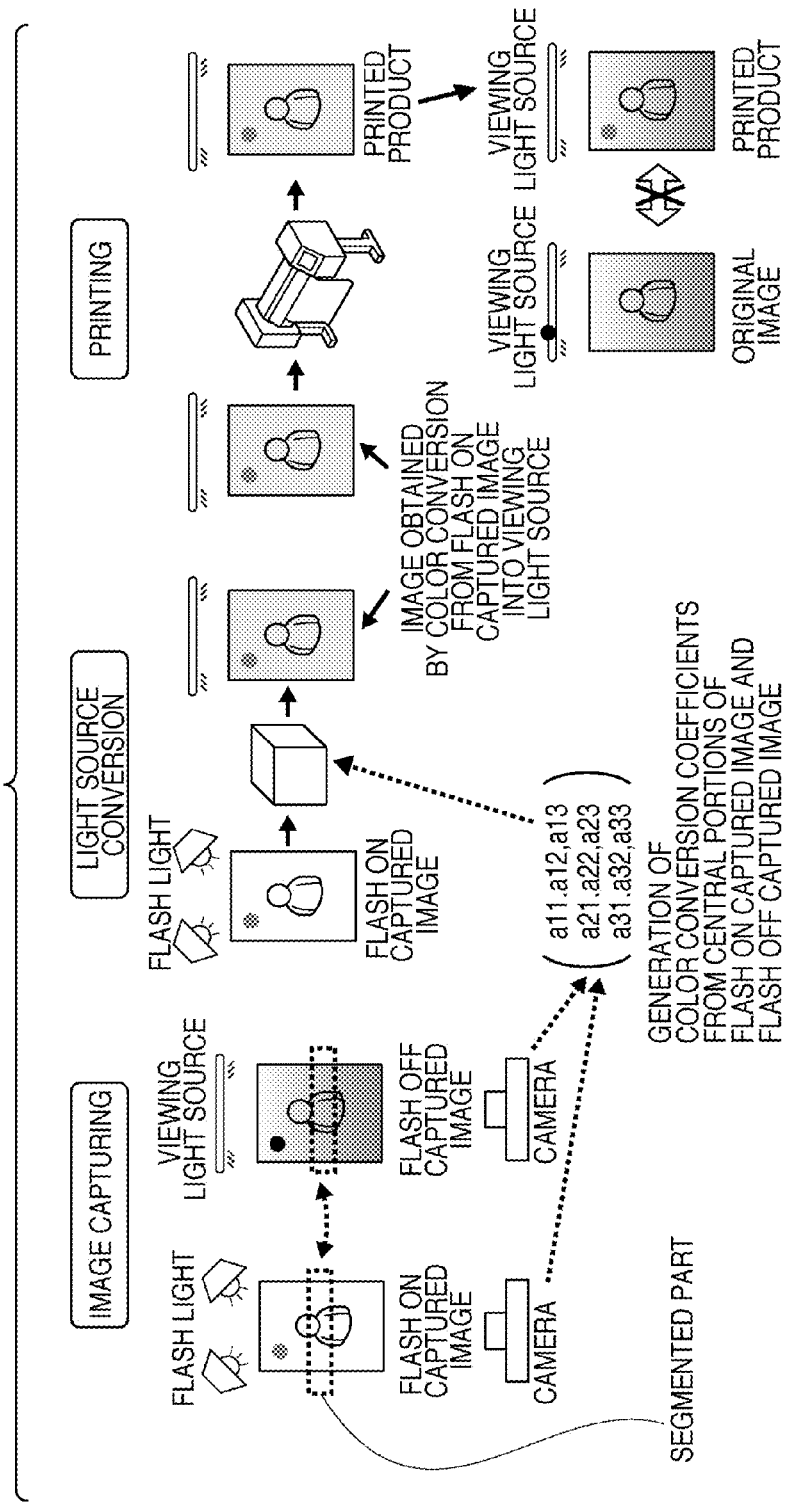
FIG. 10 is a view schematically showing how image capturing is conventionally performed for the generation of a duplicated image.

In step S205, the apparatus generates the flash light source captured image data 119 optimized for the viewing light source by performing light source conversion processing based on the light source conversion parameters 118 generated in step S204, as shown in FIG. 9B. In step S206, the apparatus generates color-converted image data 121 by applying color conversion processing to the flash light source captured image data 119 optimized for the viewing light source by using the color conversion 3D LUT 109 which stores the color conversion parameters generated in step S201.

With the processing described above, the generation of duplicated image data is complete.

Finally, as described in step S3 in FIG. 3A, the apparatus transfers the color-converted image data to the printer 103 to perform duplicated image output processing, thereby generating a duplicated image 122 whose color appearance matches the original image 110 under the viewing light source 123.

The above processing will be summarized as follows. An image captured upon uniform irradiation of flash light receives little influence of lighting unevenness. An image captured under a viewing light source without irradiation of flash light receives much influence of lighting unevenness. In order to remove this influence, this apparatus selects pixels exhibiting approximately identical colors from a plurality of positions in the captured image with flash light, and generates shading correction data for a viewing light source captured image based on the color differences between the pixels selected from the captured image with flash light and pixels at the same positions in the viewing light source captured image. The apparatus then corrects the shading of the viewing light source captured image by using the shading correction data. The apparatus further generates light source conversion parameters from the captured image with flash light and the shading-corrected viewing light source captured image. Finally, the apparatus performs light source conversion to convert the colors of the captured image with flash light into colors optimized for the viewing light source by using the light source conversion parameters, and prints a duplicated image by using the image data having undergone light source conversion. In this manner, the apparatus can generate a duplicated image whose color appearance matches the original image under the viewing light source.

According to the embodiment described above, the apparatus corrects the shading of viewing light source captured image data by using two image data including flash light source captured image data and viewing light source captured image data. The apparatus then performs light source conversion to optimize the flash light source captured image for viewing under the viewing light source by using the flash light source captured image data and the shading-corrected viewing light source captured image data. In this manner, the apparatus can generate a duplicated image whose color appearance is similar to that of an original image even under a viewing light source, with low noise, high accuracy, and little brightness unevenness.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-283433, filed Dec. 14, 2009, which is hereby incorporated by reference herein in its entirety.

What is claimed is:

1. An image processing method for applying shading correction to image data obtained by capturing an original image under a first light source and generating duplicated image data suitable for viewing under a second light source, comprising:
   obtaining first light source captured image data of the original image by capturing the original image under the first light source;
   obtaining second light source captured image data of the original image by capturing the original image under the second light source;
   extracting pixels whose values fall within a range of a preset threshold value and are regarded as approximately identical colors, and positions of the pixels from the first light source captured image data;
   extracting, from the second light source captured image data, colors of pixels corresponding to the positions of the pixels extracted from the first light source captured image data;
   generating shading correction data, with a processor, from differences in color between the corresponding pixels extracted from the first light source captured image data and the second light source captured image data; and
   applying shading correction to the second light source captured image data by using the generated shading correction data.

2. The method according to claim 1, further comprising: applying light source conversion for viewing under the second light source to the first light source captured image data by using shading-corrected image data to which the shading correction is applied.

3. The method according to claim 2, further comprising:
   printing a color chart from a printer by using preset color chart data, capturing the printed color chart under the second light source, obtaining color chart captured image data, and generating a color conversion lookup table by using the color chart data and the color chart captured image data; and
   applying color conversion to the first light source captured image data having undergone the light source conversion, by using the generated color conversion lookup table.

4. The method according to claim 3, further comprising: outputting the duplicated image of the original image by outputting the first light source captured image data having undergone the color conversion to the printer.

5. The method according to claim 1, wherein pixels of an area exhibiting high frequency of the approximately identical colors are extracted from the first light source captured image data.

6. The method according to claim 5, wherein one of an average value, a center value, and a maximum value of color values of pixels which are extracted from the second light source captured image data and correspond to the positions of the pixels extracted from the first light source captured image data is set as a target value for the shading correction.

7. An image processing apparatus for applying shading correction to image data obtained by capturing an original image under a first light source, and generating duplicated image data suitable for viewing under a second light source, comprising:

a unit configured to obtain first light source captured image data of the original image by capturing the original image under the first light source using a digital camera;

a unit configured to obtain second light source captured image data of the original image by capturing the original image under the second light source using the digital camera;

a unit configured to extract pixels whose values fall within a range of a preset threshold value and are regarded as approximately identical colors, and positions of the pixels from the first light source captured image data;

a unit configured to extract, from the second light source captured image data, colors of pixels corresponding to the positions of the pixels extracted from the first light source captured image data;

a unit configured to generate shading correction data from differences in color between the corresponding pixels extracted from the first light source captured image data and the second light source captured image data; and a unit configured to apply shading correction to the second light source captured image data by using the generated shading correction data.

8. A non-transitory computer readable medium which stores a program for causing a computer to function as each unit of an image processing apparatus according to claim 7.

* * * * *